United States Patent [19]

Lang

[11] Patent Number: 4,557,344
[45] Date of Patent: Dec. 10, 1985

[54] SERVOSTEERING, ESPECIALLY FOR MOTOR VEHICLES

[75] Inventor: Armin Lang, Schwabisch Gmund, Fed. Rep. of Germany

[73] Assignee: Zahnradfabrik Friedrichshafen, AG., Friedrichshafen, Fed. Rep. of Germany

[21] Appl. No.: 645,322

[22] PCT Filed: Sep. 28, 1983

[86] PCT No.: PCT/EP83/00250
§ 371 Date: Aug. 23, 1984
§ 102(e) Date: Aug. 23, 1984

[87] PCT Pub. No.: WO84/02500
PCT Pub. Date: Jul. 5, 1984

[30] Foreign Application Priority Data

Dec. 28, 1982 [DE] Fed. Rep. of Germany ....... 3248252

[51] Int. Cl.[4] .................................. B62D 5/08
[52] U.S. Cl. ..................... 180/143; 91/371
[58] Field of Search ........... 180/143, 142, 141, 132; 91/370, 371, 434

[56] References Cited

U.S. PATENT DOCUMENTS

| | | | |
|---|---|---|---|
| 3,690,400 | 9/1972 | Uchiyama et al. | 180/142 |
| 4,119,172 | 10/1978 | Yanagishima et al. | 180/141 |
| 4,186,818 | 2/1980 | Jablonsky | 180/143 |
| 4,274,504 | 6/1981 | Kawabata et al. | 180/143 |
| 4,438,827 | 3/1984 | Lang | 180/143 |
| 4,462,478 | 7/1984 | Lang | 180/143 |

FOREIGN PATENT DOCUMENTS

| | | | |
|---|---|---|---|
| 0062360 | 10/1982 | European Pat. Off. | 180/143 |
| 2916575 | 3/1980 | Fed. Rep. of Germany | |
| 8029580 | 12/1981 | Fed. Rep. of Germany | |
| 2095700 | 2/1972 | France | 180/142 |
| 2099770 | 5/1982 | United Kingdom | 180/143 |

Primary Examiner—John A. Pekar
Attorney, Agent, or Firm—Zalkind & Shuster

[57] ABSTRACT

A servosteering control valve is provided with fluid reaction chambers which are pressued responsive to the speed of a vehicle for effecting a simulated steering resistance wherein at low speed, as in parking, there is no steering resistance and resistance increases with speed via feedback from the chambers of a double acting servomotor. The novel feature of the arrangement herein utilizes a coaction between the inlet flow control passage and return flow control passage of a steering control spool or piston valve, one such valve for each chamber. This is in conjunction with throttle passages disposed between the manually shiftable piston valves and a valve housing. Such passages are created by portions of the shiftable valves having elements slightly smaller in diameter than the diameter of the housing bore or bores in which the valves are shiftable. A single bore is used where the valves are coaxially integral and respective bores are used where the valves are separably movable. The arrangement places the throttle passages in flow series between the servomotor chambers and the reaction chambers. The effect of the throttle passages and their relationship with the inlet and return flow control passages results in pressure control of the reaction chambers such that at low speeds the simulated steering resistance is low or non-existent, as in parking, but varying to higher resistance at higher speeds.

6 Claims, 7 Drawing Figures

SERVOSTEERING, ESPECIALLY FOR MOTOR VEHICLES

BACKGROUND OF THE INVENTION

It has been known basically to vary the simulated resistance to manual steering effort by way of increased resistance in response to increase in vehicle speed. For example, the U.S. patent to Uchiyama et al, U.S. Pat. No. 3,690,400 shows such an arrangement and other patents in the field are German DE-PS No. 21 27 070 and German DE-GM No. 80 29 580.

In particular, the patents or applications of Armin Lang, assigned to the present assignee, viz., German DE No. 31 22 370 (application), which became the present U.S. Pat. No. 4,438,827 and U.S. Pat. No. 4,462,478, are of particular pertinence as background art in that they show arrangements utilizing control valve means such as integral coaxial piston valves and separately movable piston valves, including fixed throttles in lines from the chambers of a double acting servomotor to reaction chamber of the valves for exerting pressure forces in opposite directions.

U.S. Pat. No. 4,438,827 is relied on for the closest background of the present invention and is hereby incorporated by reference along with U.S. Pat. No. 4,186,818 of Jablonsky, likewise assigned to the present assignee.

Thus, in the disclosure herein it will be understood by persons familiar with the art that the mechanical force which returns the reciprocal valve means to a neutral position after a steering operation is effected by springs such as 62, 62A, as shown in U.S. Pat. No. 4,186,818, FIG. 3. Also, the arrangement of a rotary valve housing which carries the reciprocal valves, as used in most of the modifications herein is shown in that patent together with conventional structure as shown to complete an operative booster steering device familiar to persons skilled in the art.

BRIEF DESCRIPTION OF THE INVENTION

All modifications use a manually shifted control valve of the reciprocal spool or piston type for each chamber of a double acting servomotor. In one modification the valves are in a fixed housing and in other modifications the valves are in a rotative housing of a heretofore known type as shown in U.S. Pat. No. 4,186,818 heretofore mentioned, and for the basic construction, it is shown and described in U.S. Pat. No. 4,438,827.

The latter patent shows arrangements of control valve means, one such valve mean for each chamber of a double acting servomotor. Thus, the valve means being in the form of piston valves, spaced collars are provided which coact with edges of grooves in housing bore means in which the piston valves are shiftable by manual effort on a steering wheel.

There are flow control gaps between collar edges and groove edges which are open in neutral position whereby the output of a servopump flows through to a tank and to the chambers of a servomotor. Thus, each piston valve has an inlet flow control gap and a return flow control gap and a reaction chamber.

The servomotor has a housing passage for each chamber and each housing passage is located between the inlet and return flow control gaps of a respective piston valve.

Dependent upon a steering operation and via a speed responsive variable throttle, connecting from a tank through fixed throttles to the reaction chambers, pressures in the housing can open check valves leading to the reaction chambers for producing a differential of pressure therein for simulated steering resistance.

As a novel feature of the present invention a balanced force during slow speed parking is realized so that the vehicle driver need not work against simulated steering resistance. However, upon increase of speed and especially at high speeds suitable steering resistance is effected as a safety measure.

Accordingly, the advantage of ease of parking effort but increase of steering resistance with speed is achieved. Further, the invention provides for simulated steering resistance occurring at higher speeds before booster support occurs. Thus the mechanical valve centering forces can be kept low in order to keep parking effort low, but safety is assured by an equivalent of a high mechanical centering force by virtue of the feedback to the reaction chambers in advance of power steering effect on the steering mechanism. Accordingly, there is no need to use a strong mechanical centering spring device for travel safety in fast straight ahead travel. The operating characteristics of the invention eliminate the need for providing a strong centering force which must be overcome by driver effort at the steering wheel.

In particular, although steering effort for parking must always be at least equal to the mechanical centering force, in the case of steering corrections in straight ahead fast travel, only small road reaction forces will occur at the steered wheel of the vehicle to be transmitted to the steering wheel. This can occur only if a strong mechanical valve restoring force to neutral is present, which means strong return springs, unfavorable for parking ease.

The invention provides reaction chamber pressure to increase the steering resistance, avoiding the need for strong centering spring forces in making steering corrections during fast straight ahead travel, therefore guarding against oversteering. Further, such similated steering resistance occurs without power boost of the servomotor.

The improved results are brought about by providing unequally open flow gaps for inlet and return flow control of each piston valve and by further providing the piston valves with throttle means such as collars predeterminedly spaced from the housing bores so to form throttle gaps to throttle flow from respective chambers of the servomotor to the reaction chambers. Thus throttle gaps are located between a respective servomotor passage in the housing and respective ports in the piston valve communicating with the reaction chambers.

A detailed description of the invention now follows in conjunction with the appended drawing in which:

FIG. 1 is a graph of characteristic lines showing the functions of prior art devices wherein $\Delta p$ represents differential pressures of the servomotor chambers, Md represents the manual torque on the steering wheel and $Mx_1$ is mechanical force acting on the control piston valve, or valves, for restoring neutral position in straight ahead steering, viz., spring force.

FIG. 2 has the same symbols for the same functions of the invention wherein $Mx_2$ represents the mechanical restoring, return spring force, and the added symbol $Hx_2$ represents hydraulic centering force due to reaction chamber pressure difference.

In the modifications, in order to avoid complexity of reference numerals, the same reference numerals have been used for similar components even though differing slightly in arrangement.

Figure 3:
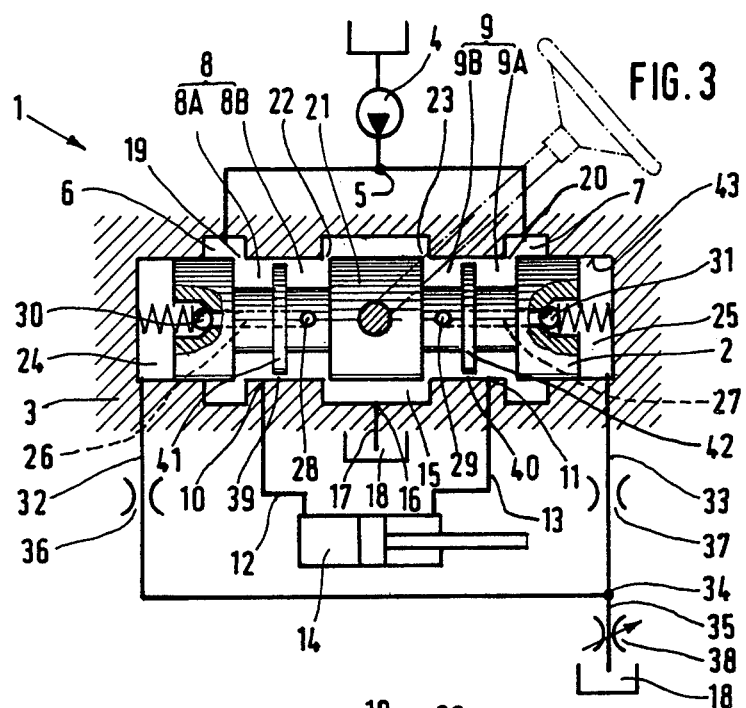
FIG. 3 shows one embodiment, in cross section, of the invention in neutral position utilizing integral piston valves operable by a manual steering wheel.

Referring to FIG. 3, a steering booster pressure control valve 1 is shown understood to be disposed in the steering gear of a vehicle (not shown) and being in neutral position wherein a booster pump output is bypassed to a tank. A steering control piston valve 2 is slidable in a valve housing 3, being actually two integral coaxial piston valves, for convenience referred to as a piston valve, obviously a pair of valves shiftable by a manually operative steering wheel, shown in phantom lines, all as depicted in FIG. 3, together with symbolic elements of the hydraulic circuitry, such as an engine driven servopump or booster pump, an oil tank, and a double acting servo motor. Oil under pressure is fed to the control valve 1 by the servopump 4 via an inlet connection 5 which branches, as shown, to a pair of annular grooves 6 and 7 in the housing. A pair of grooves 8 and 9 are provided in the valve piston 2 and communicate via lines 10, 11 and 12, 13 with the respective chambers of servomotor 14. A central annular groove 15 in the housing has a return connection 16 to a return line 17 for return flow to a tank 18.

Four flow control edges are effected by the annular grooves 6 and 7 of the housing and the respective grooves 8 and 9 of the piston valve whereby two inlet flow control gaps 19 and 20 are formed to control flow to the respective servomotor chambers. A central annular groove is provided in the housing with a valve collar 21 centrally located therein in neutral position. Thus, pairs of return flow control gaps 22 and 23 are effected for controlling return flow from the respective chambers of the servomotor.

In FIG. 3, as in all modifications, details of the spring return force are not shown in order to avoid complexity in the drawing. Any conventional mechanical return device is usable, e.g., as heretofore known in U.S. Pat. No. 4,186,818, having springs.

The ends of piston valve 2 have housing reaction chambers 24 and 25 which connect via respective reaction pressure passages, ducts 26 and 27, bored axially in the piston valve body, at the ends thereof. Respective radial bores 28 and 29 connect to ducts 26 and 27. The bores 28 and 29 effect ports exposed, respectively, between the inlet and return flow control gaps 19 and 22 and the inlet and return flow control gaps 20 and 23, as shown. Spring biased check valves 30 and 31 control flow from the reaction chamber flow ducts 26 and 27 into respective reaction chambers 24 and 25. Thus, ducts feed from locations between the inlet and return flow gaps 19-22, 20-23, respectively, into respective reaction chambers when pressure effects opening of respective check valves.

The ports are indicated in FIG. 3 by the ends of the lead lines from reference numerals 28, 29 and will be easily recognized in the other figures of the drawing.

The pressure in the reaction chambers 24 and 25 are controlled via respective lines 32 and 33 connecting to a passage 35 at a junction 34. The lines 32 and 33 for reaction chambers 24 and 25 connecting to junction 34 are provided with respective fixed throttling orifices 36 and 37. Passage 35 connects via a speed responsive throttle, such as a variable orifice 38, to the tank 18.

Variable speed responsive arrangements are known for the control orifice 38, for example, in German Pat. No. 21 27 070 as well as in U.S. Pat. No. 3,690,400 showing a nozzle-baffle plate system, and in German utility patent 80 29 580 showing a solenoid operated device. In particular, the U.S. patent describes a speed sensing system for the purpose of reaction chamber pressure control.

Thus, speed responsive variable orifice 38 is shown in line 35 between reaction chambers 24 and 25 and tank 18 wherein the orifice cross section is automatically adjusted for throttling effect in dependence on the speed of travel of the vehicle. However, the variable throttle 38 with connection to tank 18 could also be, e.g., a variable throttle 38 in the inlet line of booster pump 4. In that case, there would be some advantage in the construction and dimension of the chambers 24 and 25. Such a change is not essential to the invention and need not be described in detail. In any event such arrangement is shown and described in U.S. Pat. No. 4,438,827.

The connecting lines 10 and 11 to respective sides of the servomotor 14 and to respective ports 28 and 29 of the reaction chamber ducts 26 and 27 to reaction chambers 24 and 25 are provided with respective throttling passages 39 and 40. Such throttling passages 39 and 40 are effected between a respective narrow throttling collar 41 and 42, on the piston valve, and the surface of the bore 43 in the housing in which the piston valve 2 is slidable. Thus, as will be seen in FIG. 3, the diameters of the collars are slightly smaller than the piston valve ends, which equal the central collar. The throttling collars, shiftable axially with respect to the bore, cause piston valve grooves 8 and 9 to be divided into partial grooves 8A, 8B and 9A, 9B which vary in axial length independent on the piston valve position.

The inlet pressure flow control gaps 19 and 20 and the return flow return gaps 22 and 23 are shown with spaced edges, i.e., the gaps 19, 20 and 22, 23 are open in neutral position of the piston valve 1. It should be noted that the inlet pressure flow control gaps 19 and 20 are larger than the respective return flow gaps 22 and 23 in neutral position.

Also, the ports for bores 28, 29 receive flow from the respective servomotor passages 10, 11 through respective throttle passage means such as passages or gaps 39, 40. Such flow relationship is true for all modifications, flow being via the housing from passages 10, 11 to the ports as will be apparent.

Figure 4:
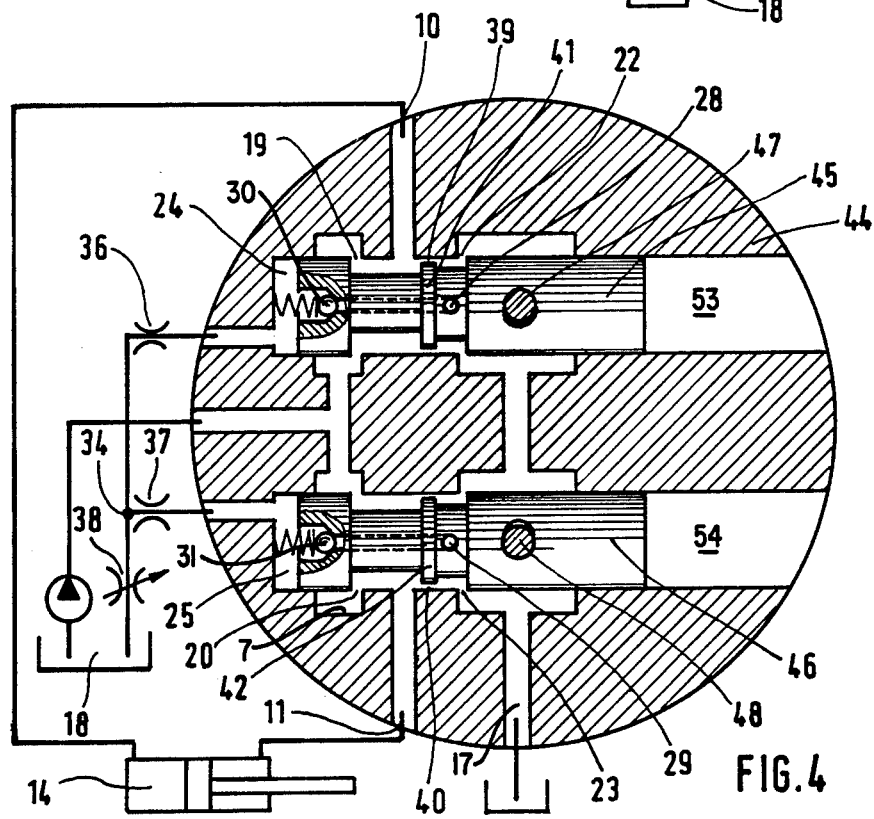
FIGS. 4 through 7 show variations in cross section of the invention in neutral position, all of which use a pair of piston valves.

FIG. 4 is a modification having a rotative housing 44 with a pair of piston valves 45 and 46. The piston valves are shifted in opposite directions by a fork shaped end of a steering spindle (not shown) having the spaced actuating FIGS. 47 and 48 in slots of the respective pistons, as shown, to permit the spindle to rotate while the piston valves reciprocate. This modification is otherwise similarly operative to that shown in FIG. 3. The piston valves are identical and the symmetrical arrangement shown permits each to effect the functions of the dual piston valve 2, piston valves 45 and 46 acting in unison. Thus, when one piston valve is pressurizing a chamber of the servomotor 14, the other piston valve is effecting return flow from the other chamber, the piston valves shifting in opposite directions when the steering wheel is manually rotated since the actuating fingers are on opposite sides of the center of symmetry. The piston valves 45 and 46 have reaction chambers 24 and 25 respectively at corresponding ends. The inlet pressure control gap 19, line 10 for servomotor 14, bore 28 for reaction chamber 24 and return flow gap 22 are disposed on piston valve 45. Throttling collar 41 (similar to FIG. 3) is carried on the piston valve to provide throttling passage 39. Correspondingly, piston valve 46 has inlet flow control gap 20, line 11 for servomotor 14, bore 29 for reaction chamber 25 and return flow gap 23, with throttling collar 42 effecting throttling passage 40 intermediate the inlet and return flow gaps. Further, the fixed throttles 36 and 37 and speed responsive throttle 39 of the reaction chamber arrangement are as found in FIG. 3.

Figure 5:
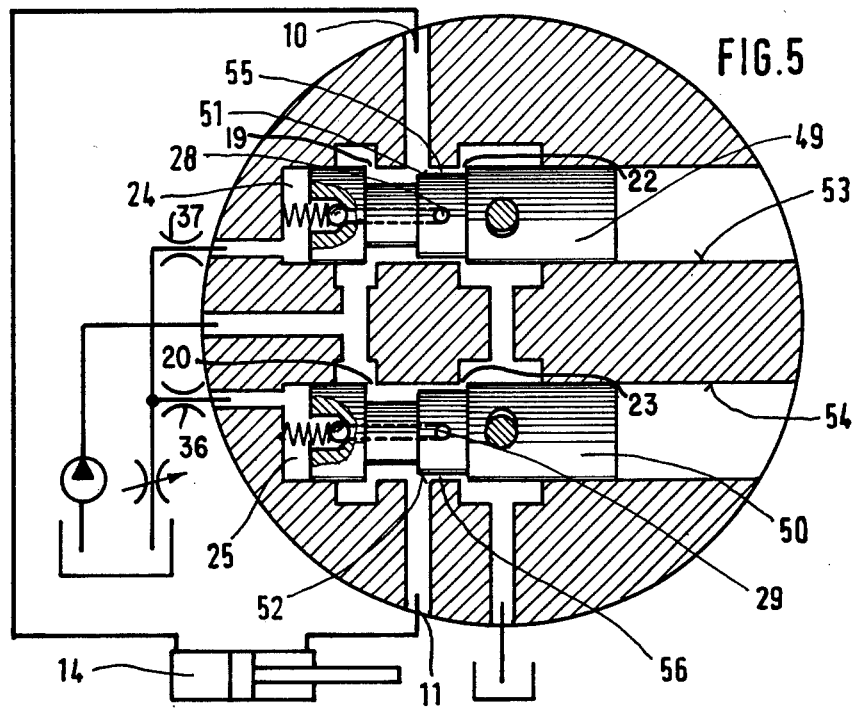

FIG. 5 shows an arrangement wherein the narrow collars 41 and 42 of FIGS. 3 and 4 have been replaced by axially elongated collars, 51 and 52, stepped portions of the piston valves slightly reduced in diameter as compared with the diameters of piston valves 49 and 50, respectively, which are the diameters of their housing bores. Collars 51 and 52 are dimensioned relative respective housing bores 53 and 54 to effect throttling passages 55 and 56. The arrangement permits a shorter design of the piston valves since bores 28 and 29 for respective reaction chambers 24 and 25 can then be almost in the same plane axially relative to piston valves 49 and 50 as the connecting passages thereto for the lines 10 and 11 to servomotor 14. This is possible when bores 28 and 29 and those passages for lines 10 and 11 have angularly related axes, e.g., 90° as shown in FIG. 5.

Figure 6:
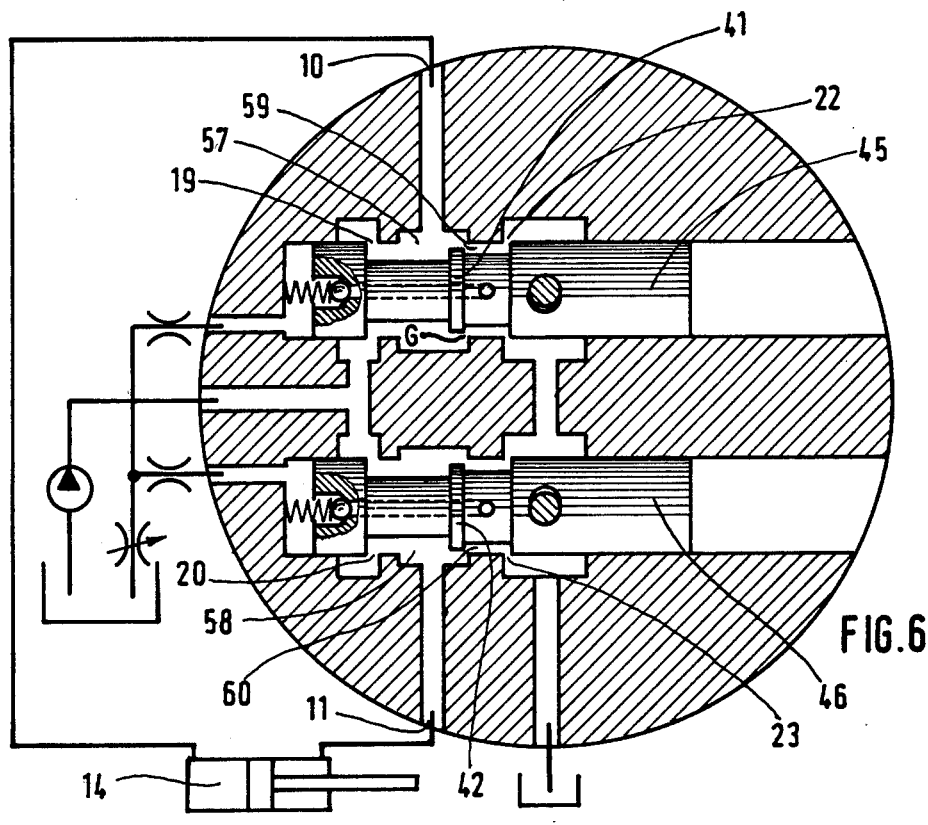

FIG. 6 shows the narrow throttling collars 41 and 24 which are effective only when respective valve pistons 45 and 46 are shifted slightly from neutral position. The passages for lines 10 and 11 for servomotor 14 are provided with respective annular grooves 57 and 58 within the respective housing bores.

It will be noted that collars 41, 42 are offset from the respective edges of grooves 57, 58 to permit a free flow of circulating oil through open gap G in neutral position. However, upon slight shift of the piston valves 45, 46, the collars being slightly smaller in diameter than the respective housing bores 53 and 54, effect respective throttle passages 55, 56 when inserted into the annular boares.

The free flow openings as seen in FIG. 6 are slightly smaller than the inlet flow control gaps 19, 20 and the return flow control gaps 22, 23 so that the throttling passages become effective when the piston valves are shifted in order to coact with the inlet and return gaps.

Thus, upon shift, dependent on direction, throttle passages 59 and 60 become effective, then return control flow gap 23 or 22 closes, then inlet flow control gap 19 or 20 closes.

OPERATION (FIGS. 3–7)

Referring to FIGS. 3 and 4, if variable throttle 38 is closed and the piston valves are in neutral position, flow passes through the housing 3 from servopump to tank and the pressure drops through throttle passages 39, 40 are equal. The opposing pressures in reaction chambers are then equal and the reaction forces on the valves are balanced.

Assume a small movement of control valve shift, e.g., in FIG. 3 piston valve 2 goes to the right, or in FIG. 4 piston valve 45 shifts to the right and piston valve 46 goes to the left. Due to the large inlet gaps 19, 20 as compared with return gaps 22, 23, a slight shift causes no significant change at gaps 19, 20 but at gap 22, 23 there is significant pressure change. However, there is no significant pressure change in the chambers of servomotor 14.

There is an increase of flow via 19-22 and a decrease via 20-23, as will be apparent from the widening of gap 22 and the narrowing of gap 23.

Thus, the pressure gradiant at the throttle passage 39 increases, while the pressure gradient at throttle passage 40 decreases.

Accordingly, the pressures in grooves 8A and 9A have insignificant change, but the pressures in grooves 8B and 9B have definite change in the region of the ports to reaction chamber passages 28, 29.

If, as noted above, variable throttle 38 is closed, the difference in pressures at the ports has no effect because, due to check valve 31 being closed, no flow can occur from the higher pressure region at 28 to the lower pressure region at 29. Thus, no flow passes through the fixed throttle 36, 37 and reaction chambers 24, 25 are pressure equalized.

In this operating area, i.e., variable throttle 38 being closed, there can be no hydraulic reactive force due to imbalance of pressures in the reaction chambers. Only the mechanical return force of conventional valve return springs (U.S. Pat. No. 4,186,818) is active if the steering wheel is operated and the manual effort cannot be greater than the spring return force $Mx_2$. This is true even though booster steering pressure is available.

Figure 2:
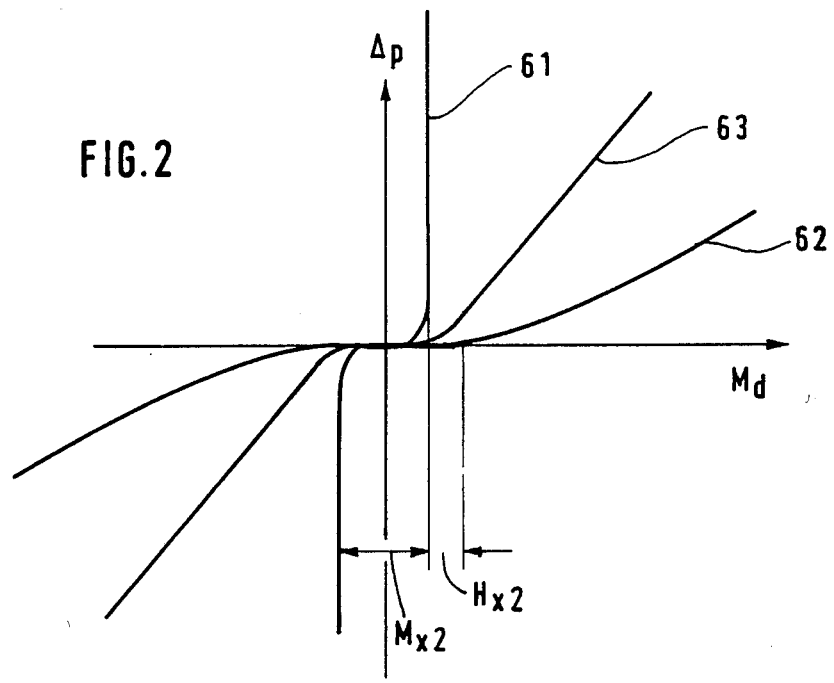

This condition is illustrated by the characteristic line 61 on FIG. 2, a so-called "cut-off" line illustrating a parking characteristic.

Figure 1:
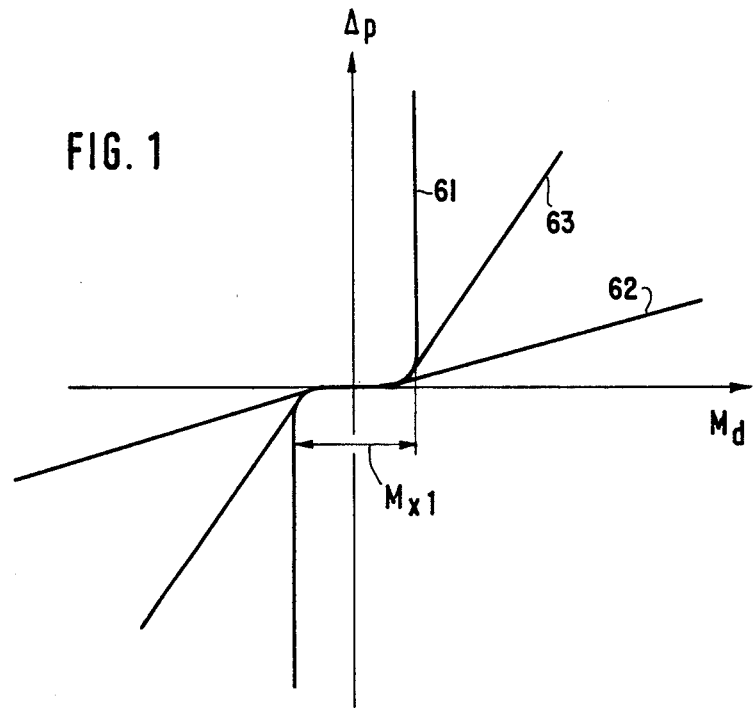

On FIGS. 1 and 2 the differential pressure $\Delta p$ of the servomotor is ploted on the ordinate and the manual steering torque effort Md is along the abscissa.

For purposes of steering wheel correction without pressurizing the servomotor while traveling on a straight road at some speed effecting an open variable throttle 38, only slight steering wheel movement causes very little piston valve movement.

Thus, a slight movement of piston valve 2 or piston valve 45 to the right and piston valve 46 to the left, return gap 22 opens wider while return gap 23 is narrowed. However, no effective increase or decrease in the openings of inlet gaps 19 or 20 is occasioned. The widening of return gap 22 permits an increase of flow through throttle passage 39 and the narrowing of gap 23 decreases flow through throttle passage 40, causing a greater pressure drop through throttle passage 39 and a lesser pressure drop through throttle passage 40. This difference in pressures is at the regions to the ports of reaction passages 28, 29 and thus in the respective reaction chambers 24, 25. Since the inlet gaps 19, 20 have had no significant increase, there is no significant increase in pressure flow to the servomotor 14.

However, the differential pressure of the reaction chambers, viz., lower in reaction chamber 24 and higher in reaction chamber 25 is felt at the steering wheel as a centering force $Hx_2$ created by hydraulic reaction, i.e., the vehicle driver feels that the steering wheel is receiving a centering force counteracting inadvertent turning and he corrects accordingly to eliminate the feeling of such a force.

If now the valves 2 and 45 be further shifted to the right in FIGS. 3 and 4, with variable throttle 38 wide open for high speed driving, gaps 19 and 23 assumed closed. There is flow from servopump 4 via groove 7, passage 11, line 13, to the right side chamber of servomotor 14 and thence via passage 29, check valve 31 to reaction chamber 25. Return flow is from the left side of servomotor 14 via passage 10, line 12, throttle 39, gap 22, line 17 to tank 18. There is a pressure drop from reaction chamber 25 via fixed throttle 37 to tank 18, but no flow through fixed throttle 36, gap 23 being closed. Therefore there is no pressure difference and reaction chamber 24 has only the pressure of tank 18. This condition gives the highest reaction force.

Assume now that variable throttle valve 38 is fully closed as it would be for low speed as in parking. The flow to servomotor 14 is still to the right side chamber and from the left side chamber as above. However, there is now flow via passage 29, check valve 31 to reaction chamber 24 from whence it can go no further because variable throttle valve 38 is closed. Therefore, the pressures are the same in both reaction chambers and there is no net force of steering resistance.

Assume now the same shifted conditions as just preceding, but variable shifted throttle valve 38 is half open, the flow to and from servomotor 14 being as described. There is an increased pressure drop over variable throttle 38, being half open. Accordingly, there is a pressure differential in favor of chamber 25 of medium degree, not as great as for a wide open variable throttle 38. Such steering resistance is for medium speed.

Referring now to FIG. 2, the characteristic line 61 as mentioned represents a "cut-off" line, i.e., variable throttle 38 closed for parking at low speed. Line 62 represents high speed, variable throttle 38 wide open. Line 63 represents medium speed, variable throttle 63 half open. Noting the horizontal portion of line 62, it is longer than that for line 61, being the sum of $Mx_2$, mechanical centering force and $Hx_2$, hydraulic centering force, viz., reactive force effecting steering resistance. The contrast with FIG. 1 for the same lines is evident as an improvement over the prior art.

In general, for speeds below high speed, the variable throttle 38 will be partially closed causing a pressure just upstream of the variable throttle valve 38, e.g., at junction 34. This results in a reduction of pressure differential between reaction chambers 24 and 25. Accordingly, the hydraulic centering force decreases as indicated in FIG. 2 by line 63 showing a shortened extent of horizontal components.

Considering the discussion of operation above, it will be apparent that due to the complete symmetry of the components in FIGS. 3 and 4, if a reverse shift of the piston valves is had, the hydraulic reaction in the chambers 24 and 25 and the flow to and from servomotor 14 and the piston direction will all obviously be reversed.

In further detail of discussion of FIGS. 3 and 4, whenever the variable throttling valve 38 is closed, only the mechanical spring force (U.S. Pat. No. 4,186,818) is available for valve centering. There is no hydraulic reaction; the manual force (Md) cannot be greater than the mechanical spring force $Mx_2$ even though booster steering pressure is available.

When variable throttle 38 is open at high speed travel, pressure flow from the servopump can enter reaction chambers 24 and 25 via check valves 30 and 31 through the fixed throttles 36 and 37, all respectively, and thence return via the variable throttle 38 to tank 18. If that throttle be opened so wide that at junction 34 for lines 32 and 33 the tank pressure prevails, the reaction chambers 24 and 25 have no effect on each other.

Neglecting flow resistance, e.g., of check valve 30 and 31, and variable throttle valve 38 being open, the pressure in reaction chambers 24 and 25 is the same as at the ports to respective passages 28 and 29. If pressure in passage 28 becomes less than at passage 29, the valve means being shifted only slightly the unbalance of pressure forces in the reaction chambers acts against shift of the valve means. However, inlet flow control gaps 19 and 20, in a slight shift being open, the servomotor chambers have equal pressure, neglecting as mentioned above all unintentioned flow resistance in the system. Accordingly, the hydraulic unbalance is in the nature of a mechanical centering force on the valve means which is additive to the mechanical spring force.

Further shift of the valve means, e.g., commencing the closing of return flow through gap 23 results in increased flow through piston valve 2 of FIG. 3, or through piston valve 45 (FIG. 4). This results in a greater flow at throttling collar 41, thus resulting in a pressure differential build up in passages 28 and 29 until the shift causes inflow gap 19 to become fully effective due to full closure at return gap 23. At that time the right side chamber of servomotor 14 is pressurized for power boost.

The operation of FIGS. 5 and 6 is the same as previously described. The distinction in FIG. 5 is that the throttling elements on the piston valves are axially elongated collars 55, 56 rather than narrow collars 41, 42 of FIGS. 3, 4 and 6. In FIG. 6 collars 41, 42 are set off at G for free flow in neutral until the collars shift to coact with housing lands to effect throttling gaps 59, 60 much the same as the throttling gaps 39, 40 of FIG. 4 or 55, 56 of FIG. 5.

Figure 7:
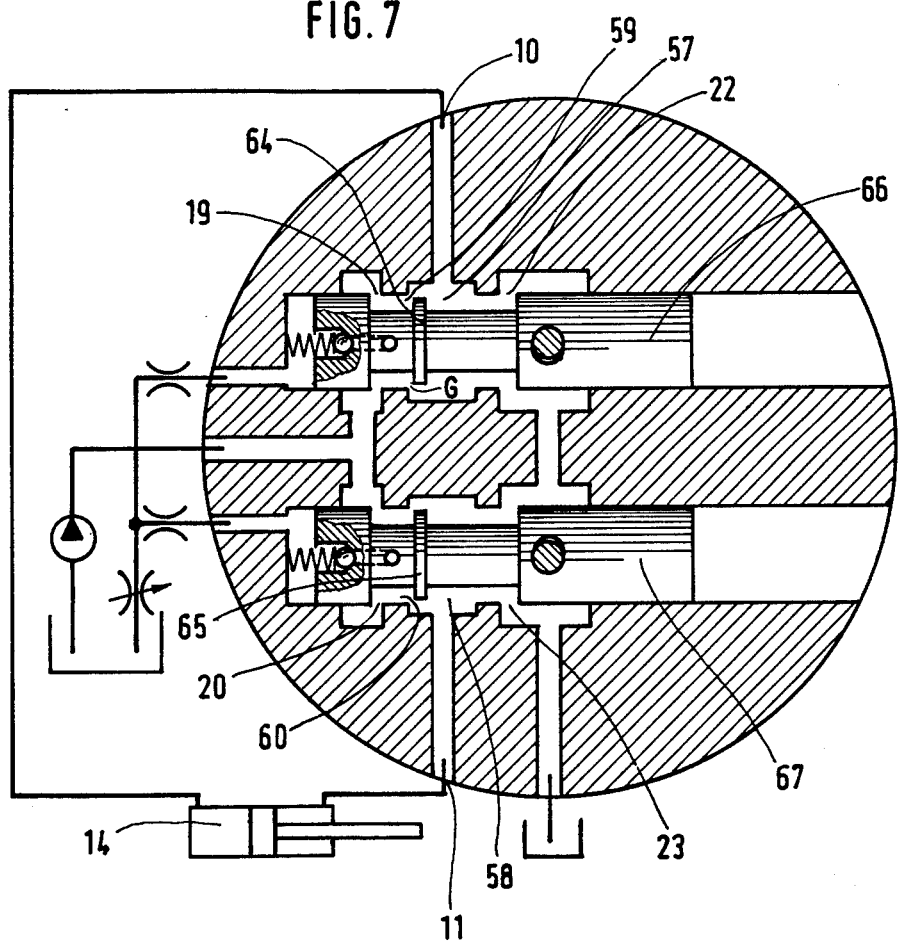

FIG. 7 shows a variation of FIG. 6 is structure. In FIGS. 3–6 the throttling passages 39, 40 (FIGS. 3, 4) or 55, 56 (FIG. 5) or the throttling passages 59, 60, 41, 42 (FIG. 6), together with the respective throttling collars, are located between the servomotor passages 10, 11 on one side and the return flow control gaps, 22, 23 on the other side. In FIG. 7 the throttle collars 64, 65 are set off at G for free flow in neutral and throttle passages of respective piston valves 66, 67 are located between the servomotor passages 10, 11 and the inlet flow control gaps 19, 20.

Such variation is also usable in the modifications of FIGS. 3–5.

The operation of FIG. 7 is the same as in FIGS. 3–6 insofar as response to variable throttle valve 38 is concerned. Thus, for a small shift of valve means the pressure difference between the reaction chambers 24, 25 changes, but the pressure difference in the chambers of the servomotor is insignificant. The mechanical action and gap control sequence is the reverse of that in FIGS. 3–6.

Persons skilled in the art can vary the characteristics shown in FIG. 2 as a matter of design and selection of gap dimensions and control sequence of openings.

In retrospect:

It will be noted that in all modifications the flow to the reaction chambers 24, 25 via passages 26, 28 or 27, 29, respectively, from respective servomotor passages 10, 11 must pass through respective internal annular throttle passages in the housing bores of the several modifications, e.g., throttle passages 39, 40 of FIGS. 3 and 4; 55, 56 of FIG. 5; 59, 60 of FIGS. 6 and 7.

In neutral, FIGS. 3-6 inlet flow control gaps 19 and 20 are wider than the respective return flow control gaps 22 and 23. In FIG. 7 gaps 22, 23 are wider than respective gaps 19, 20.

In FIGS. 3-6 the return flow control gaps 22, 23 are adjacent and closer to the ports for passages 28, 29 respectively, than are the respective inlet flow control gaps 19 and 20. FIG. 7 has an opposite relationship. Accordingly, variations in design are possible.

Further, with regard to the neutral position of FIGS. 6 and 7, the axial offset of the collars 41, 42 and 64, 65, respectively, for free flow in neutral, effect open gaps smaller than the inlet flow control gaps 19, 20 and the outlet flow control gaps 22, 23 to ensure throttling for pressure drop before steering control becomes effective.

Common to all modifications is the locating of all the internal throttle passages between inlet flow control gaps 19, 20 on the one side and return flow control gaps 22, 23 on the other side. In FIGS. 3-6 the inlet flow control gaps 19, 20 are upstream of the respective throttling passages, while the return control flow gaps 22, 23 are downstream. The opposite is true of FIG. 7.

In all modifications a throttling passage (39, 40 etc.) is between a servomotor passage 10, 11 and a respective reaction chamber 24, 25, so that flow from a servomotor passage to a reaction chamber must always pore through a throttling passage to cause a pressure increase in a reaction chamber as compared with a pressure decrease in the opposed reaction chamber.

Thus, differential pressures in the reaction chambers are felt as steering resistance forces by the vehicle driver, but no booster pressure to the servomotor occurs unless the valve means is manually shifted to a predetermined degree and provided that the speed responsive throttle is not closed.

I claim:

1. In a motor vehicle steering system of the kind described for pressurizing and exhausting chambers of a double acting servomotor;

comprising a pair of piston valves (2) (45, 46) (49, 50) (66, 67) manually shiftable in bore means (43, 53, 54) in a housing (3) (44) and exposed to opposing pressures in respective reaction chambers (24, 25) and having coaction with said housing to provide inlet flow control gaps (19, 20) and return flow control gaps (22, 23) for pressurizing and exhausting said servomotor chambers wherein said gaps are open in neutral position;

means (26, 28) (27, 29) providing flow passage from said servomotor chambers to respective reaction chambers through respective check valves (30, 31) wherein each servomotor chamber connects to said housing intermediate an inlet flow control gap and a return flow control gap;

means comprising fixed throttle means (36, 37) and a speed responsive variable flow throttle (38) effecting pressure control of said reaction chambers;

the improvement comprising:

throttle passage means (39, 40) (55, 56) (59, 60) in said housing operatively disposed to throttle flow from said servomotor chambers to respective reaction chambers (24, 25) at pressures determined by flow through said respective throttle passage means;

either of said flow control gap means comprising gaps predeterminedly wider in neutral position than the gaps of the other gap means whereby flow through said valve means is dependent on predetermined shifted positions of said valve means to initially cause equal or unequal opposed pressures in said reaction chambers responsive to closure or opening of said speed responsive throttle (38) and throttling of flow to respective reaction chambers by said throttle passage means;

wherein said servomotor is pressurized only subsequent to a further predetermined degree of shift of said valve means independently of an open or closed condition of said speed responsive throttle means;

whereby reaction chamber centering force on said piston valves is variable and dependent on vehicle speed, varying from low at low speeds to high at high speeds.

2. In a motor vehicle steering system as set forth in claim 1, said inlet flow control gaps (19, 20) being wider than said return flow control gaps (22, 23).

3. In a motor vehicle steering system as set forth in claim 1, said return flow control gaps (22, 23) being wider than said inlet flow control gaps (19, 20).

4. In a motor vehicle steering system as set forth in claim 1, wherein said throttle passage means comprises collars (41, 42) (51, 52) (64, 65) on said piston valves peripherally spaced from said bore means in said housing to form throttling passages (39, 40) (55, 56) (59, 60) through which flow passes from a servomotor chamber to a respective reaction chamber.

5. In a motor vehicle steering system as set forth in claim 4, wherein said housing has grooves (57, 58) in which said collars (41, 42) (64, 65) are disposed when said piston valves are in neutral position to effect neutral flow gaps (G) by being axially spaced from respective portion of said bore means which coact with said collars to effect said throttle passage means when said piston valves are shifted whereby flow past said collars in neutral position is unimpeded by throttle effect.

6. In a motor vehicle steering system as set forth in claim 5, wherein said neutral flow gaps (G) are narrower than the inlet or return control flow gaps.

* * * * *